United States Patent [19]
Jeffers et al.

[11] 4,247,106
[45] Jan. 27, 1981

[54] SYSTEM ARRANGEMENT FOR DISTRIBUTION AND USE OF VIDEO GAMES

[75] Inventors: Michael F. Jeffers, Flourtown, Pa.; Jacob Shekel, Brookline, Mass.; Charles L. Dages, Colmar; Joseph Glaab, New Hope, both of Pa.

[73] Assignee: Jerrold Electronics Corporation, Hatboro, Pa.

[21] Appl. No.: 895,809

[22] Filed: Apr. 12, 1978

[51] Int. Cl.³ .................................................. A63F 9/22
[52] U.S. Cl. ......................... 273/85 G; 273/237; 273/313; 273/DIG. 28
[58] Field of Search ............ 273/85 G, 101.2, 237, 273/DIG. 28; 35/9 A; 358/93, 142; 340/323 R

[56] References Cited
U.S. PATENT DOCUMENTS

| | | | |
|---|---|---|---|
| 3,921,161 | 11/1975 | Baer | 273/85 G |
| 4,026,555 | 5/1977 | Kirschner et al. | 273/85 G |
| 4,034,990 | 7/1977 | Baer | 273/85 G |
| 4,071,697 | 1/1978 | Bushnell et al. | 179/2 TV |
| 4,094,079 | 6/1978 | Dorsett | 35/9 A X |
| 4,095,791 | 6/1978 | Smith et al. | 273/85 G |
| 4,126,851 | 11/1978 | Okor | 273/85 G X |

*Primary Examiner*—Vance Y. Hum
*Attorney, Agent, or Firm*—Hopgood, Calimafde, Kalil, Blaustein & Lieberman

[57] ABSTRACT

An improved system arrangement for distributing and permitting use of an ensemble of program controlled television games includes head end apparatus for impressing an array of game-regulating programs onto an electronic distribution system, e.g., by time division multiplexing into an assigned frequency band on a television program distributing CATV or MATV cable. At any of plural receiver locations connected to the distribution channel, a user desiring a game selects ("tunes") the game frequency band and loads a game program memory (RAM) with the program for the particular game desired. The composite apparatus then functions in the now per se conventional manner to actually implement the selected game in conjunction with a television receiver and player control(s).

2 Claims, 1 Drawing Figure

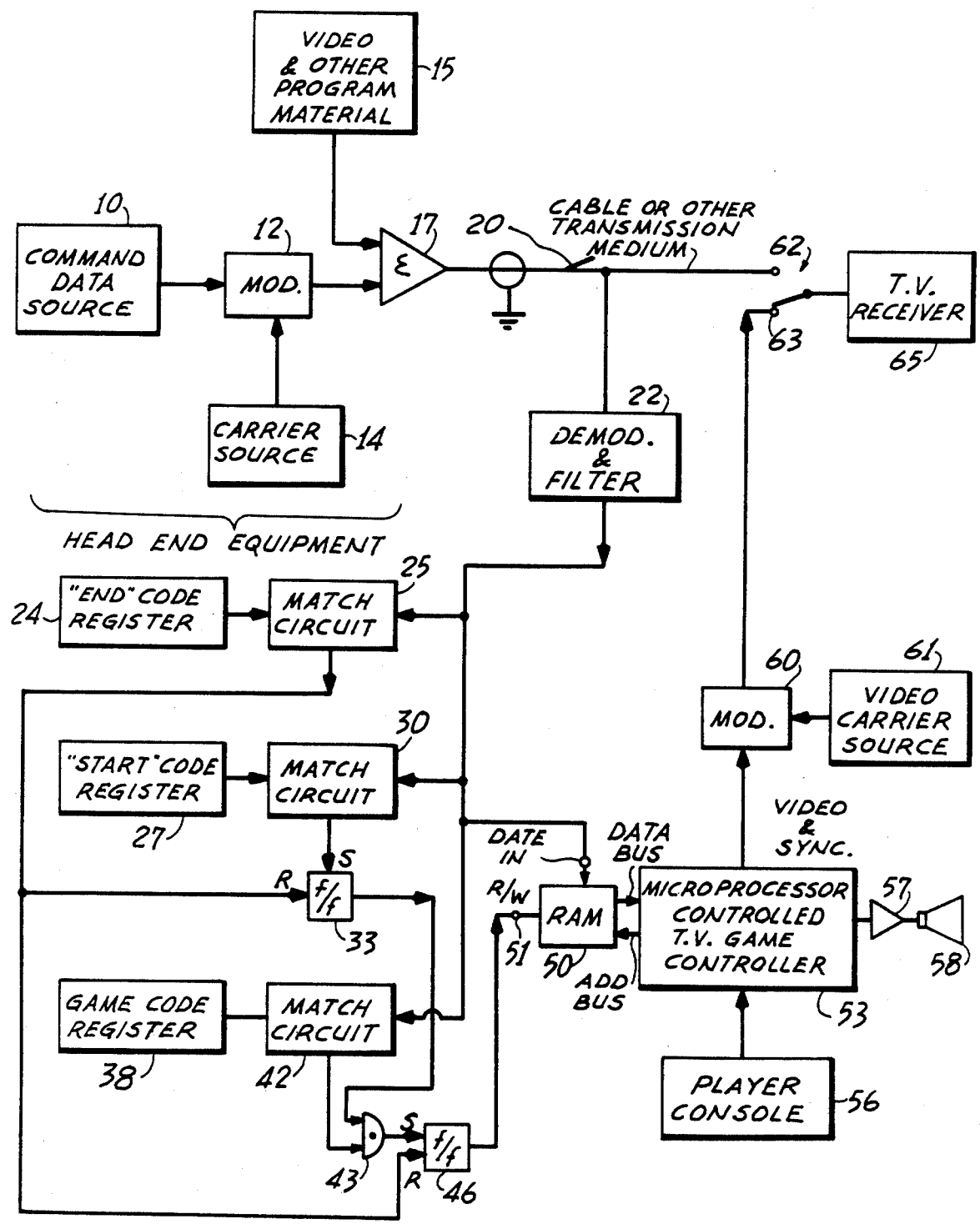

SYSTEM ARRANGEMENT FOR DISTRIBUTION AND USE OF VIDEO GAMES

This invention relates to electronic television games and, more specifically, to a video distribution system permitting game selection and use from a continuously offered game ensemble.

Television games have become an item of common experience, and permit one or more game players to control the position of moving spot(s) on the display of a conventional television receiver. Television games include such as simulated ball sports-for example, tennis, handball or Ping Pong; maze traverses; combat situations; puzzles; target "shooting"; among an ever expanding list. Initially, such games were formed of discrete, dedicated electronics hardware which performed only one game (or, via switches, a switch-selected one of a very limited number of games.)

More recently, electronic television games have been program or software controlled. That is, a digital microprocessor has been packaged with memory and player-actuated display spot position controlling potentiometers. The particular game (and its attendant rules with their concommitant effect on the video and audio presentation) is determined by the particular contents of a specific program read into eraseable memory-by a tape cassette and player or the like. Thus, the game is changed by varying the memory contents.

In each such form of television game apparatus, the user is limited either to the specific game variations initially purchased (first offered, hard wired apparatus), or to the games corresponding to tape cassettes purchased.

It is thus an object of the present invention to provide improved electronic television game apparatus.

More specifically, it is an object of the present invention to provide improved television game apparatus wherein an ensemble of game governing programs are continuously available for user selection and use from a common electronic communications channel.

The above and other objects of the present invention are realized in specific, illustrative video game apparatus which includes head end apparatus for impressing an array of game-regulating programs onto an electronic distribution system, e.g., by time division multiplexer into an assigned frequency band on a television program distributing CATV or MATV cable.

At any of plural receiver locations connected to the distribution channel, a user desiring a game selects ("tunes") the game frequency band and loads a game program memory (RAM) with the program for the particular game desired. The composite apparatus then functions in the now per se conventional manner to actually implement the selected game in conjunction with a television receiver and player control(s).

The above and other features and advantages of the present invention will become more clear from the following detailed description of a specific illustrative embodiment thereof presented hereinbelow in conjunction with the accompanying drawing which comprises a block diagram of electronic television game apparatus employing the principles of the present invention.

Referring now to the system arrangement shown in the drawing, head end equipment 8 comprises apparatus for impressing upon a video signal distribution medium, e.g. a coaxial cable 20, an ensemble of digital programs each containing the requisite program instructions to implement a particular and definite television game. For purposes of concreteness, it will be assumed that the game-controlling program are serially time division multiplexed onto the cable 20 or other distribution medium in an assigned game frequency band which is frequency division multiplexed with other video signals, e.g., conventional telelvision programs, also impressed on the distribution medium. The time division multiplexing format for each game program may advantageously comprise: (1) a leading message controlling "start" predetermined digital code group, followed by (2) the numerical identity of the particular game program listing to follow; (3) the actual sequence of program instructions; and, finally, (4) a particular, predetermined "end of message" binary code group.

The above described signal array may be formed in many ways well known to those skilled in the art. For example, a command data source 10, (e.g., a simple magnetic tape or other sequential memory having the game program lists and start, game identity or end code commands stored thereon may supply such game and control information as the modulating input to a modulator and filter 12 which also received the assigned carrier from a carrier source 14. The television game program wave is then supplied to one input of a linear combiner and amplifier 17, as are all of the other television programs available for subscriber selection supplied by a source 15 thereof. For standard television reception without converters, the source 15 supplies television programs in their normal VHF or UHF channel frequency allocations, with the output of the modulator 12 (i.e., the game instruction sets) either within the spectrum of a locally unused channel, in the inter-channel 6-7 midband range, in a superband channel, or elsewhere as is per se conventional. Where a converter is employed, the frequency of the programs supplied by the source 15 may be of any assignment receivable by via a converter.

The cable 20 or other distribution medium will typically have a large number of subscriber receiver stations connected thereto, one such station being shown in detail in the drawing. At the subscriber location shown (and all other via like fashion) when a viewer wants to receive normal television, he operates a switch 62 to connect a switch transfer member to a terminal 63. A standard television receiver 65 is thus connected to the cable and selects one of the programs originally supplied by the source 15 in a conventional manner. Again, where a television is employed, the user's converter will simply be employed to heterodyne one of the video programs furnished by the source 15 to the fixed converter output channel for reception by the television receiver 65.

Correspondingly, when a user having the station equipment shown wishes to utilize a television game, the switch 62 is put in its second state with the transfer member engaging the terminal 63. With the switch 62 so disposed, the output of a modulator 62, comprising a desired video game wave at a frequency band corresponding to a standard television channel (usually one not associated with a local station) is supplied to the receiver. The game in service corresponds to that having its program then stored as discussed below in the manner in a read/write erasable memory 50 (RAM), and is operative in conjunction with a television game display controlling microprocessor 53; player actuated potentiometers or the like in a player console 56; a sound amplifier 57 and loudspeaker 58 (for example, which produces the "hit" sound of common experience for many games); the modulator 60; and a video carrier source 61. The elements 50, 53, 56, 57, 58, 60 and 61 form per se conventional program controlled TV game apparatus which effect a particular game depending upon the currently stored instruction set in RAM 50. Operation of such elements is well known to those skilled in the art and will not be repeated in any further detail here. Indeed, such assemblies are currently sold by several manufacturers as complete assemblies; and see the 1977 Micro Electronics Data Catalog of General Instruments Corporation, Copyright 1977, for a description of its GIMINI programmable game multi-chip set.

Attention will now be focused on the manner in which the RAM 50 is loaded with the instruction set of a specific desired game and, in particular, the game specified by the contents of a game code register 38. The register 38 may be loaded by a subscriber at the station shown in the drawing in any way well known to those skilled in the art, e.g. by setting thumb wheel selector switches, by electronic keyboard input, or the like.

A demodulator and filter 22 is tuned to the game ensemble frequency band output of modulator filter 12 at the head end, and supplies at its output the base band digital sequence originally supplied at the head end by the command data source 10. As a first step in the RAM 50 loading procedure, a match (comparator) circuit 30 continuously reviews the incoming data stream for the presence of a "start" bit group. This may be effected, for example, by supplying a match circuit (digital comparator) with the bit stream output of the demodulator and filter 22 and also with the contents of a start code register 27 having, as fixed contents, the predetermined binary pattern comprising the start code. Upon recognizing the start code which proceeds each game identification number and instruction set, the digital comparator (match circuit) 30 sets a flip-flop 33. Comparators or match circuits 30 (and 25 and 42 below discussed) are well known to those skilled in the art. Thus for example the match circuit 30 may comprise a shift register for clocking in (delaying) the serial output of demodulator and filter 22, and employing coincidence logic to parallel-detect any match obtaining between all bits of the start code stored in the register 27 with a like number of bits assembled in the shift register from the receive message.

A match circuit 42 examines the sequence of incoming digits (again the output of the demodulator and filter 22) for a game identification number identically corresponding to the desired game code loaded into the register 38 by the user. Upon finding such a match–and assuming prior recognition of a "start" code (set flip-flop 33), an AND gate 43 is fully enabled and sets a flip-flop 46. The set flip-flop 46 supplies a write level command to read/write mode control port 51 of the RAM 50. Accordingly, the next following sequence of instructions, corresponding to the instructions set for the desired game, flow from the output of demodulator and filter 22 into the "data" input of the RAM 50 and therefrom into storage cells in the RAM 50 under control of the write-level control potential at the RAM control port 51. RAM addressing, during writing, may be by any method well known per se to those skilled in the art, e.g. direct manner access sequential under control of microprocessor 53 and an executive permanently stored RAM loading program or the like. The RAM 50 is thus loaded with the full instructions set for the desired game.

At the end of the instruction set, the mandated "end" code burst transmitted by the command data source 10 and present at the output of the demodulator and filter 22 is recognized in match circuit 25 also supplied with the fixed contents of an "end" code register 24. The "match" output signal from circuit 25 resets the flip-flops 33 and 46. The reset flip-flop 46 restores the RAM control potential at RAM port 51 to the read mode level thus locking further bits present at the output of demodulator and filter 22 out of the RAM.

Accordingly, the RAM 50 is loaded with the instruction set for the desired game specified by the input loaded into register 38–and only that game. The apparatus 50, 53, 56, 57, 58, 60 and 61 thus operates thereafter in what is again a per se conventional manner for such equipment to implement the specified game in conjunction with the television receiver 65. At any time a different game is desired, the user simply changes the contents of register 38 thus loading the new instruction set into the RAM 50. Accordingly, a user can select any game from the entire game ensemble originated by command data source 10. Games may be added, corrected or updated as desired by head end changes requiring no subscriber involvement. Finally, it is observed that such flexible game implementation is delivered without any purchase commitment on the part of the user.

The above described arrangement is merely illustrative of the principles of the present invention. Numerous modifications and adaptations thereof will be readily apparent to those skilled in the art without departure, from the spirit and scope of the invention. Thus, for example, any so called "frame grabber" circuitry or system, per se well known in the art, may be employed between the output of demodulator and filter 22 and RAM 50 to load the RAM 50.

What is claimed is:

1. In combination, head end apparatus including means for generating an electronic wave includng a plurality of multiplexed electronic television game governing program instruction sets, wave distribution means for disseminating said wave, and at least one station means coupled to said wave distribution means, each of said station means including a program instruction set controlled electronic television game including a read and write memory, a program controlled processing unit connected to said memory, and user control means, said program instruction set controlled electronic television game being adapted to execute the television game having its program instruction set then stored in said read and write memory, said station means further comprising user actuated game specifying input means for specifying that one of the multiplexed ensemble of television game governing program instruction sets desired for implementation, and means responsive to said game specifying input means for loading the one of said multiplexed television game governing programs defined by said specifying means into said read and write memory, wherein said memory game governing program instruction set loading means in each of said station means includes selector circuit means for receiving the program instruction set ensemble supplied by said wave generating means and for receiving an output from said game specifying input means for selecting and entering said selected game program instruction set in said read and write memory.

2. A combination as in claim 1 further comprising a television receiver, and a modulator connecting said processing unit and said television receiver.

* * * * *